United States Patent
Ofuji et al.

(10) Patent No.: US 8,195,238 B2
(45) Date of Patent: Jun. 5, 2012

(54) MOBILE STATION APPARATUS, BASE STATION APPARATUS, AND PAGING METHOD

(75) Inventors: Yoshiaki Ofuji, Yokohama (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 551 days.

(21) Appl. No.: 12/304,258

(22) PCT Filed: Jun. 14, 2007

(86) PCT No.: PCT/JP2007/062051
§ 371 (c)(1),
(2), (4) Date: Feb. 26, 2009

(87) PCT Pub. No.: WO2007/148608
PCT Pub. Date: Dec. 27, 2007

(65) Prior Publication Data
US 2009/0280841 A1    Nov. 12, 2009

(30) Foreign Application Priority Data
Jun. 19, 2006   (JP) .................................. 2006-169440

(51) Int. Cl.
*H04M 1/00* (2006.01)
(52) U.S. Cl. ..................... 455/561; 455/458; 455/550.1; 370/312
(58) Field of Classification Search .................. 455/561, 455/458, 550.1; 370/312
See application file for complete search history.

(56) References Cited

U.S. PATENT DOCUMENTS

| | | | | |
|---|---|---|---|---|
| 5,940,763 | A * | 8/1999 | Alperovich et al. | 455/450 |
| 7,197,333 | B2 * | 3/2007 | Hwang et al. | 455/560 |
| 2004/0198294 | A1 * | 10/2004 | Hagin-Metzer | 455/296 |
| 2004/0253959 | A1 * | 12/2004 | Hwang et al. | 455/450 |

FOREIGN PATENT DOCUMENTS

| | | |
|---|---|---|
| CN | 1369187 A | 9/2002 |
| JP | 2004-531937 A | 10/2004 |
| JP | 2005-526460 A | 9/2005 |
| WO | 99/67972 | 12/1999 |

(Continued)

OTHER PUBLICATIONS

International Search Report issued in PCT/JP2007/062051, mailed on Oct. 9, 2007, with translation, 6 pages.

(Continued)

*Primary Examiner* — Danh Le
(74) *Attorney, Agent, or Firm* — Osha • Liang LLP (57) ABSTRACT

A disclosed paging method includes a random access channel generating step of, when a group including an own station is being paged based on a paging indicator channel (PICH) transmitted from a base station apparatus, generating a random access channel (RACH) including information indicating a response to the paging indicator channel (PICH) by a mobile station apparatus; a transmitting step of transmitting the random access channel (RACH) by the mobile station apparatus; a random access channel detecting step of detecting the random access channel (RACH) as the response to the paging indicator channel (PICH) by the base station apparatus; a paging information generation determining step of determining whether paging information is to be generated based on a detection result of the random access channel (RACH); and a paging information generating step of generating paging information based on the determination result.

7 Claims, 13 Drawing Sheets

FOREIGN PATENT DOCUMENTS

WO 2005/015776 A1 2/2005
WO 2005/079086 A2 8/2005

OTHER PUBLICATIONS

Written Opinion issued in PCT/JP2007/062051, mailed on Oct. 9, 2007, 5 pages.

Keiji Tachikawa, "W-CDMA Mobile Communication System," Maruzen K.K., pp. 255-256, Jun. 24, 2001, with English translation, 9 pages.

Office Action issued in Chinese Patent Application No. 200780030517.3, dated Aug. 4, 2010, and English translation thereof (11 pages).

* cited by examiner

MOBILE STATION APPARATUS, BASE STATION APPARATUS, AND PAGING METHOD

TECHNICAL FIELD

The present invention relates to a mobile station apparatus, a base station apparatus, and a paging method.

BACKGROUND ART

In a mobile communication system, when a call is placed to a terminal (paging terminal), it is necessary to inform the terminal that the call is placed to the terminal. The network of the mobile communication system manages the location information of each terminal as the location registration area of the terminal by allocating a Location Area Identifier (LAI) for each location registration area. The network informs each of the terminals in the location registration area where the paging terminal is registered that the call is placed to the paging terminal. This procedure is called paging (see, for example, Non Patent Document 1).

Figure 1:
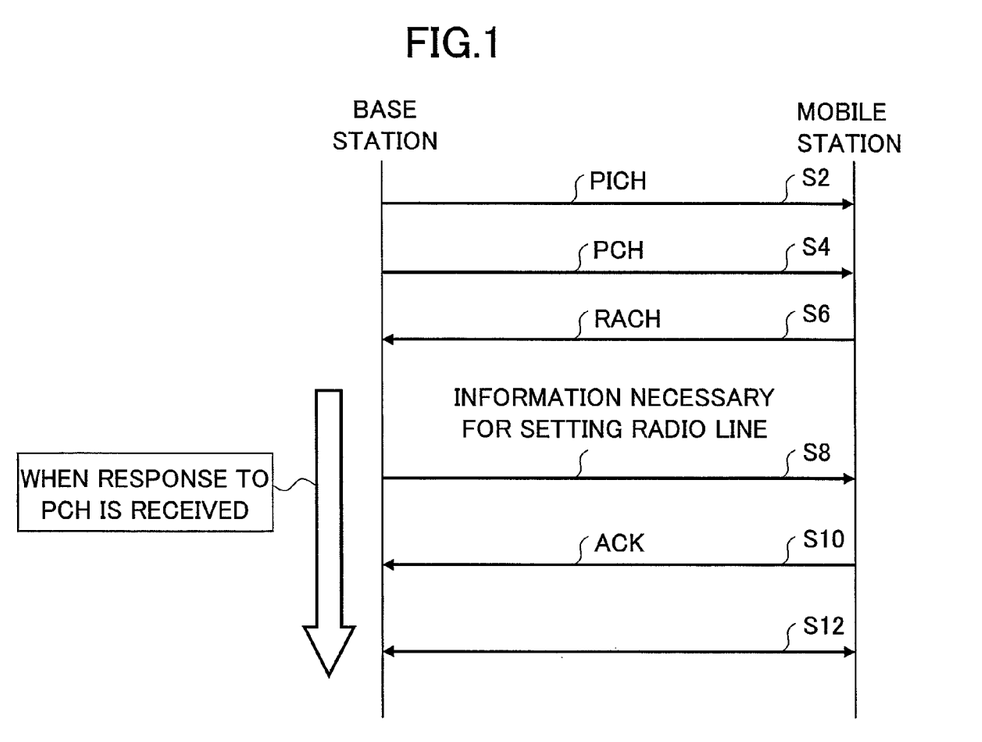
FIG. 1 is a sequence diagram showing a paging method.

FIG. 1 shows a procedure of receiving paging information in a W-CDMA system.

As shown in FIG. 1, first, the base station transmits a paging indicator channel (PICH) (step S2).

Next, the base station transmits a paging channel (PCH) (step S4). After receiving the PICH, the mobile station determines whether a group including the mobile station is being paged. When determining that the group including the mobile station is being paged, the mobile station receives the PCH from the base station.

After receiving the PCH, the mobile station determines whether the mobile station is being paged. When determining that the mobile station is being paged, the mobile station (paging mobile station) transmits a random access channel (RACH) (as a response to the received PCH) (step S6). Namely, the paging mobile station does not respond to the PCH by transmitting the RACH until the paging mobile station receives the information indicating that the mobile station is being paged (paging information).

After receiving the RACH as the response to the PCH from the paging mobile station, the base station transmits information necessary for setting up a radio line to the paging mobile station (step S8).

Based on the received information necessary for setting up the radio line, the paging mobile station starts the procedure of setting up the radio line, and transmits an "ACK" signal to the base station (step S10), and starts communications (step S12).

Figure 2:
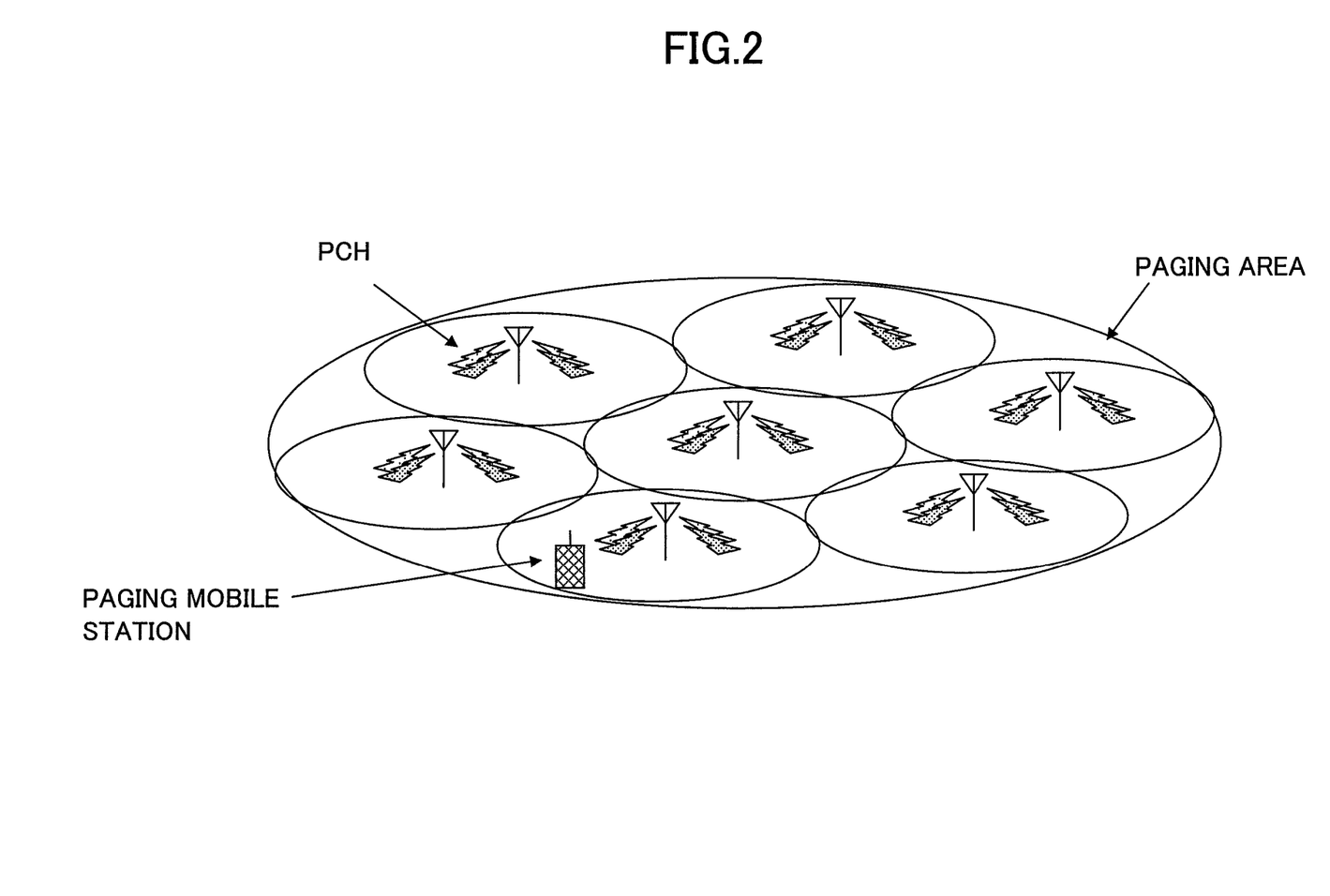
FIG. 2 is a drawing showing a paging method.

In such a mobile communication system, as shown in FIG. 2, the paging information is simultaneously transmitted in each of the cells of the same paging area. Namely, in each cell of the same paging area, the paging information is transmitted through the PCH regardless of whether the paging mobile station is located in the cell.

Further, in such a mobile communication system, it is known that the mobile station reduces battery power consumption of the PCH by performing the following method.

Figure 3:
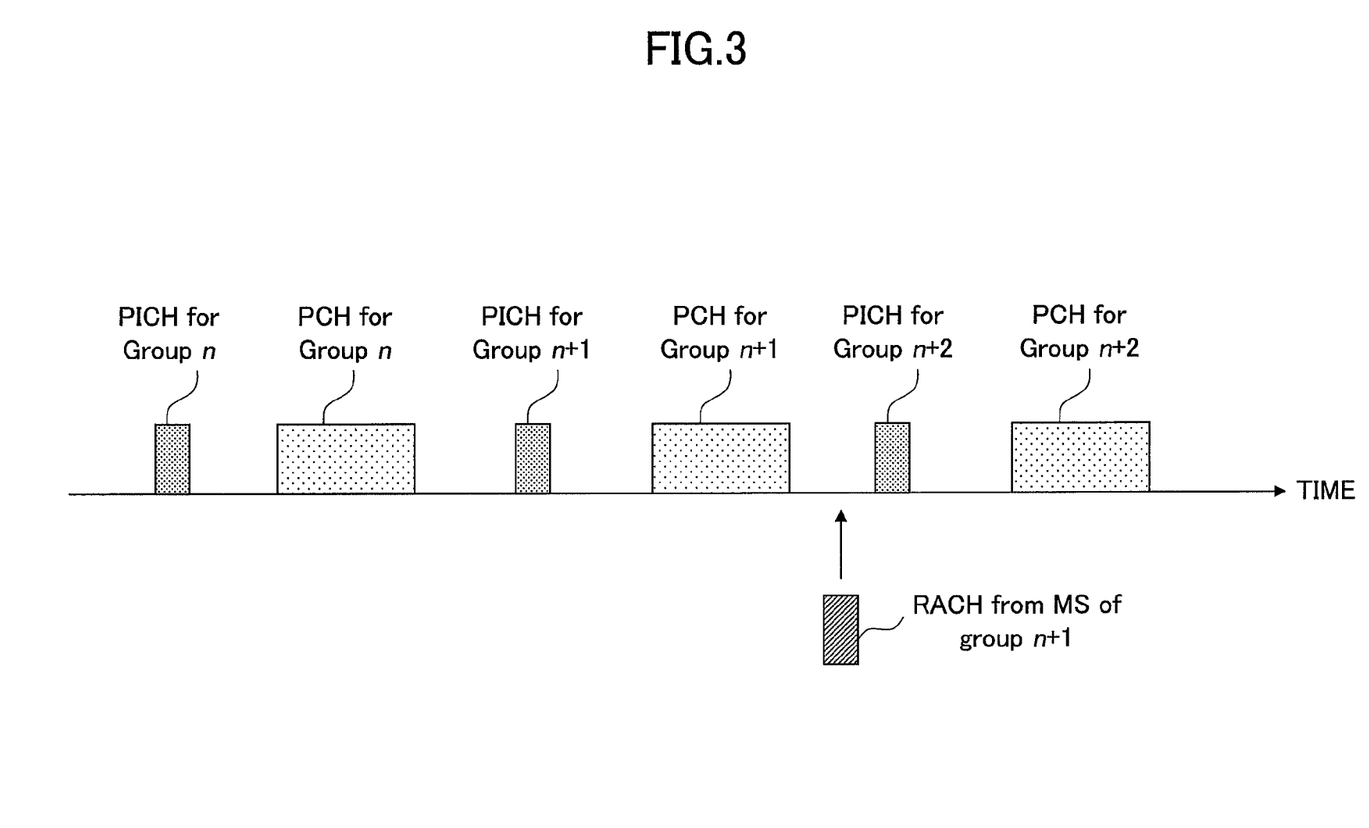
FIG. 3 is another drawing showing a paging method.

As shown in FIG. 3, each mobile station is included in one (group) of a plurality of groups, and when the base station transmits the paging information through the PCH, the paging information is transmitted to each of the groups by using a time-division multiplexing method.

Each mobile station performs a receiving operation only when the paging information is transmitted for the group including the mobile station. By doing this, the power consumption is reduced.

Further, each paging indicator channel (PICH) for the corresponding group may be provided so that the PICH includes the information whether there is the page information for the corresponding group. By doing this, each mobile station may detect whether the group including the mobile station is being paged, thereby avoiding the reception of unnecessary PCH.

Non Patent Document 1: "W-CDMA mobile communication system" pp. 255-256, edited by Keizo TACHIKAWA, published by Maruzen K.K.

DISCLOSURE OF INVENTION

Problems to be Solved by the Invention

However, the above described prior art may have the following problems.

Each base station included in one paging area has to transmit all paging information related to the paging area regardless of whether the paging mobile station is located in the cell. As a result, the base station having its coverage cell area where no paging mobile station is located may waste the downlink radio resource of the base station.

Further, when plural mobile stations in the same group are in waiting status in the same cell, the probability of the collision of the RACH transmission as the response to the PICH from the plural mobile stations may be increased.

The present invention is made to solve at least one of the problems and may provide a mobile station apparatus, a base station apparatus, and a paging method capable of avoiding the transmission of unnecessary paging information.

Means for Solving the Problems

To solve the problems, according to an aspect of the present invention, there is provided mobile station apparatus including a random access channel generating unit, when a group including an own station is being paged based on a paging indicator channel (PICH) transmitted from a base station apparatus, generating a random access channel (RACH) including information indicating a response to the paging indicator channel (PICH); and a transmitting unit transmitting the random access channel (RACH).

By doing this, the mobile station apparatus may inform the base station covering the area where the mobile station apparatus is located that the group including the own mobile station is being paged.

According to another aspect of the present invention, there is provided a base station apparatus including a paging indicator generating unit generating a paging indicator including information indicating the transmission frequency bandwidth and the transmission timing of a control channel (CCH) designating the transmission frequency bandwidth and the transmission timing of a paging channel (PCH); and a transmitting unit multiplexing the paging indicator into a paging indicator channel (PICH) and transmitting the paging indicator.

By doing this, the information indicating the transmission frequency bandwidth and the transmission timing of the control channel (CCH) designating the transmission frequency bandwidth and the transmission timing of the paging channel (PCH) may be transmitted to the mobile station apparatus through the paging indicator channel (PICH).

According to still another aspect of the present invention, there is provided a base station apparatus including a random access channel detecting unit, when a paging indicator channel (PICH) is transmitted and information indicating a response to the paging indicator channel (PICH) is transmitted through a random access channel (RACH) from a mobile station apparatus included in a group which is being paged, detecting the random access channel (RACH) as the response to the paging indicator channel (PICH); a paging information generation determining unit determining whether paging information is to be generated based on the detection result of the random access channel (RACH); and a paging information generating unit generating paging information based on the determination result.

By doing this, the paging information may be transmitted only when the random access channel (RACH) is received as the response to the paging indicator channel (PICH).

According to still another aspect of the present invention, there is provided a paging method including a random access channel generating step of, when a group including an own station is being paged based on a paging indicator channel (PICH) transmitted from a base station apparatus, generating a random access channel (RACH) including information indicating a response to the paging indicator channel (PICH) by a mobile station apparatus; a transmitting step of transmitting the random access channel (RACH) by the mobile station apparatus; a random access channel detecting step of detecting the random access channel (RACH) as the response to the paging indicator channel (PICH) by the base station apparatus; a paging information generation determining step of determining whether paging information is to be generated based on a detection result of the random access channel (RACH); and a paging information generating step of generating paging information based on the determination result.

By doing this, the paging information may be transmitted only when the random access channel (RACH) is received as the response to the paging indicator channel (PICH).

Advantageous Effect of the Invention

According to an embodiment of the present invention, there may be provided a mobile station apparatus, a base station apparatus, and a paging method capable of avoiding the transmission of unnecessary paging information.

EXPLANATION OF REFERENCES

100 BASE STATION APPARATUS
200 MOBILE STATION APPARATUS

BEST MODE FOR CARRYING OUT THE INVENTION

Next, embodiments of the present invention are described with reference to the accompanying drawings. It should be noted that the same reference numerals are used for the same elements having the same functions and repeated descriptions of the same elements are omitted.

First, a mobile communication system according to an embodiment of the present invention is described with reference to FIG. 4.

Figure 4:
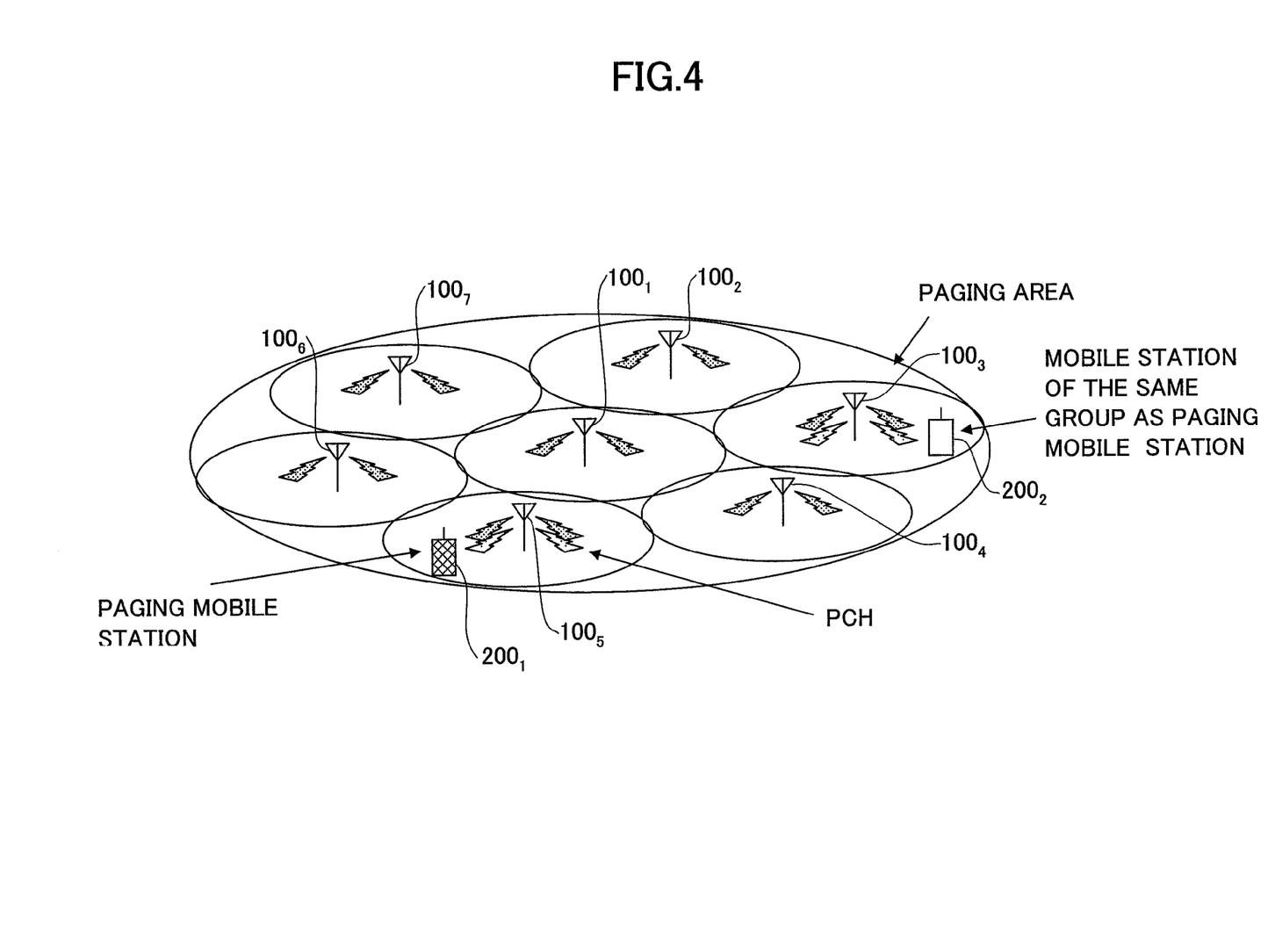
FIG. 4 is a drawing showing a paging method according to an embodiment of the present invention.

As shown in FIG. 4, the mobile communication system according to an embodiment of the present invention includes base station apparatuses 100 ($100_1$, $100_2$, $100_3$, $100_4$, $100_5$, $100_6$, $100_7$) and mobile station apparatuses 200 ($200_1$, $200_2$). Each of the areas covered by a prescribed plural number of base stations constitutes a paging area. In this embodiment, a case is described where each of the areas covered by seven base station apparatuses ($100_1$, $100_2$, $100_3$, $100_4$, $100_5$, $100_6$, $100_7$) constitutes the paging area.

Figure 5:
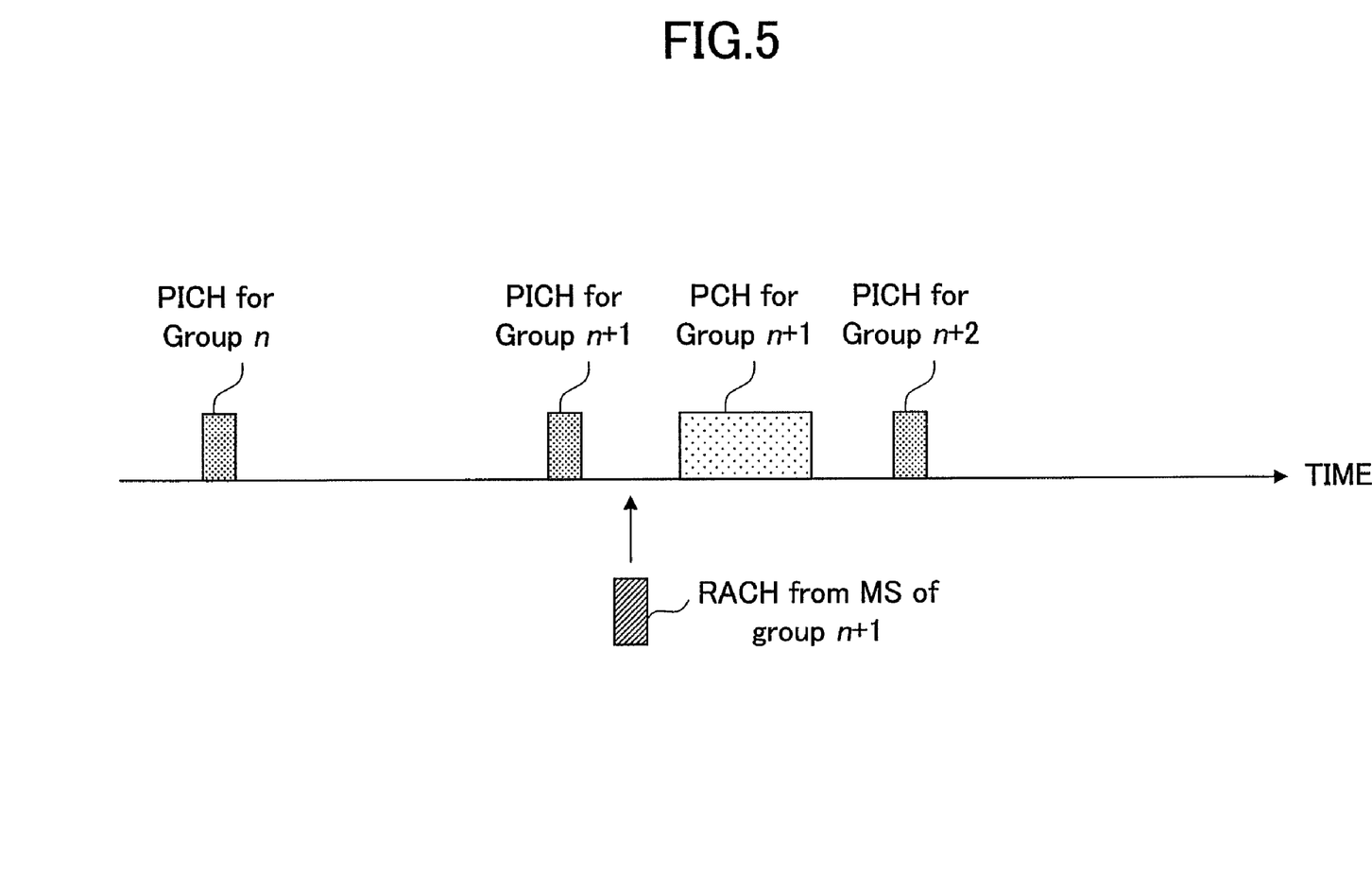
FIG. 5 is another drawing showing a paging method according to an embodiment of the present invention.

In a mobile communication system according to an embodiment of the present invention, as shown in FIG. 5, a paging indicator channel (PICH) is simultaneously transmitted in each cell of the same paging area. Then, a paging channel (PCH), however, is transmitted only in the cell where a response to the PICH is transmitted.

When the mobile station apparatus receives the PICH and detects that the group including the mobile station is being paged, the mobile station apparatus transmits the information indicating the response to the PICH through a random access channel (RACH).

After receiving the response to the PICH, the base station apparatus transmits paging information through the PCH. In the example of FIG. 5, each of the PICHs with respect to the groups "n", "n+1", and "n+2" is transmitted, and the mobile station apparatus of group "n+1" detects that the group including the mobile station is being paged and transmits the RACH. After receiving the RACH from the mobile station apparatus of group "n+1", the base station apparatus transmits the paging information with respect to the group "n+1" through the PCH.

After receiving the PCH, the paging mobile station apparatus transmits the information indicating the response to the PCH through the RACH. After receiving the response to the PCH, the base station apparatus transmits the information necessary for setting up a radio line.

After receiving the information necessary for setting up the radio line, the paged mobile station apparatus starts the procedure of setting up the radio line.

Next, a base station apparatus 100 according to an embodiment of the present invention is described with reference to FIG. 6.

Figure 6:
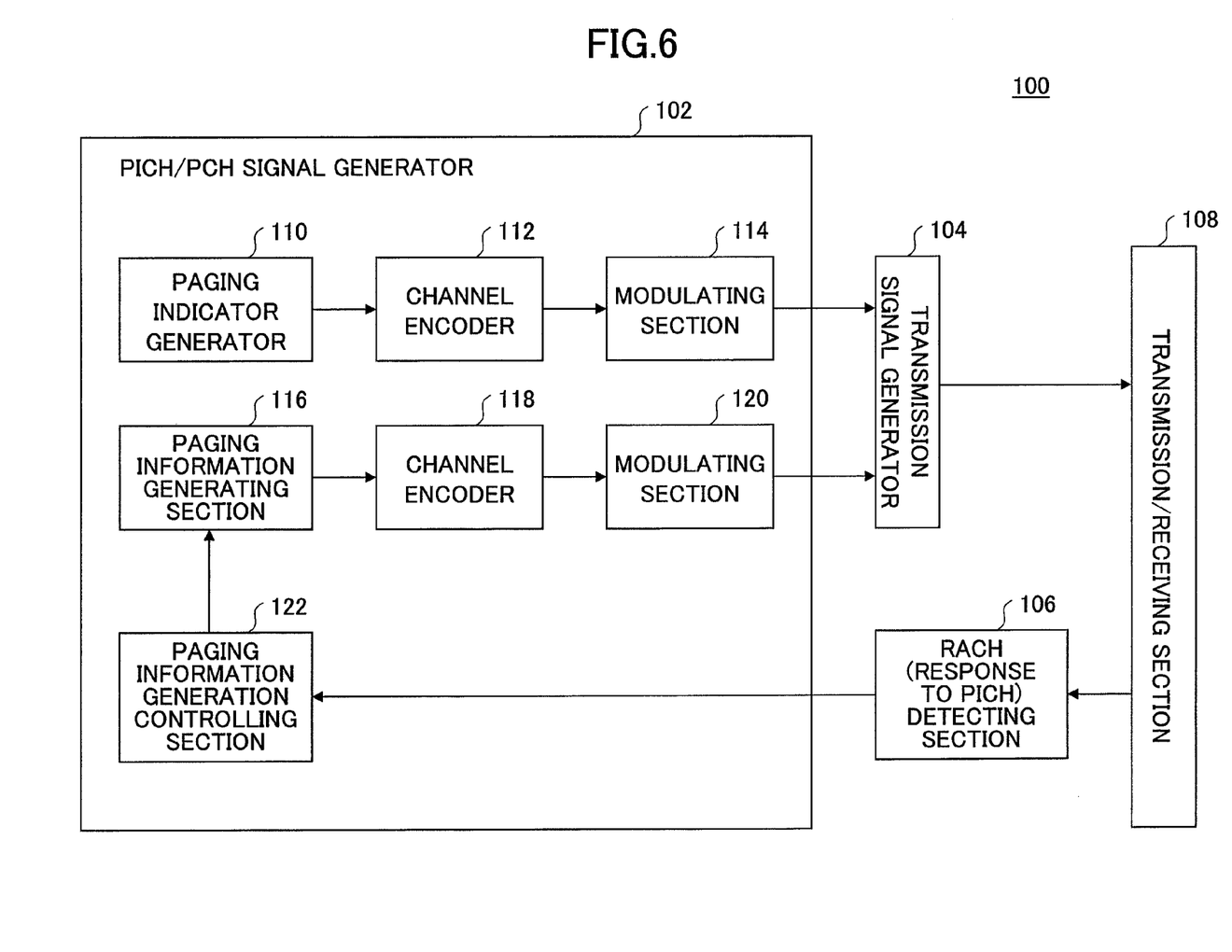
FIG. 6 is a block diagram showing a configuration of the base station apparatus according to an embodiment of the present invention.

As shown in FIG. 6, the base station apparatus 100 includes a PICH/PCH signal generator 102, a transmission signal generator 104, a RACH detecting section 106, and a transmitting/receiving section 108.

The PICH/PCH signal generator 102 includes a paging indicator generator 110, channel encoders 112 and 118, modulating sections 114 and 120, a paging information generating section 116, and a paging information generation controlling section 122.

Figure 7:
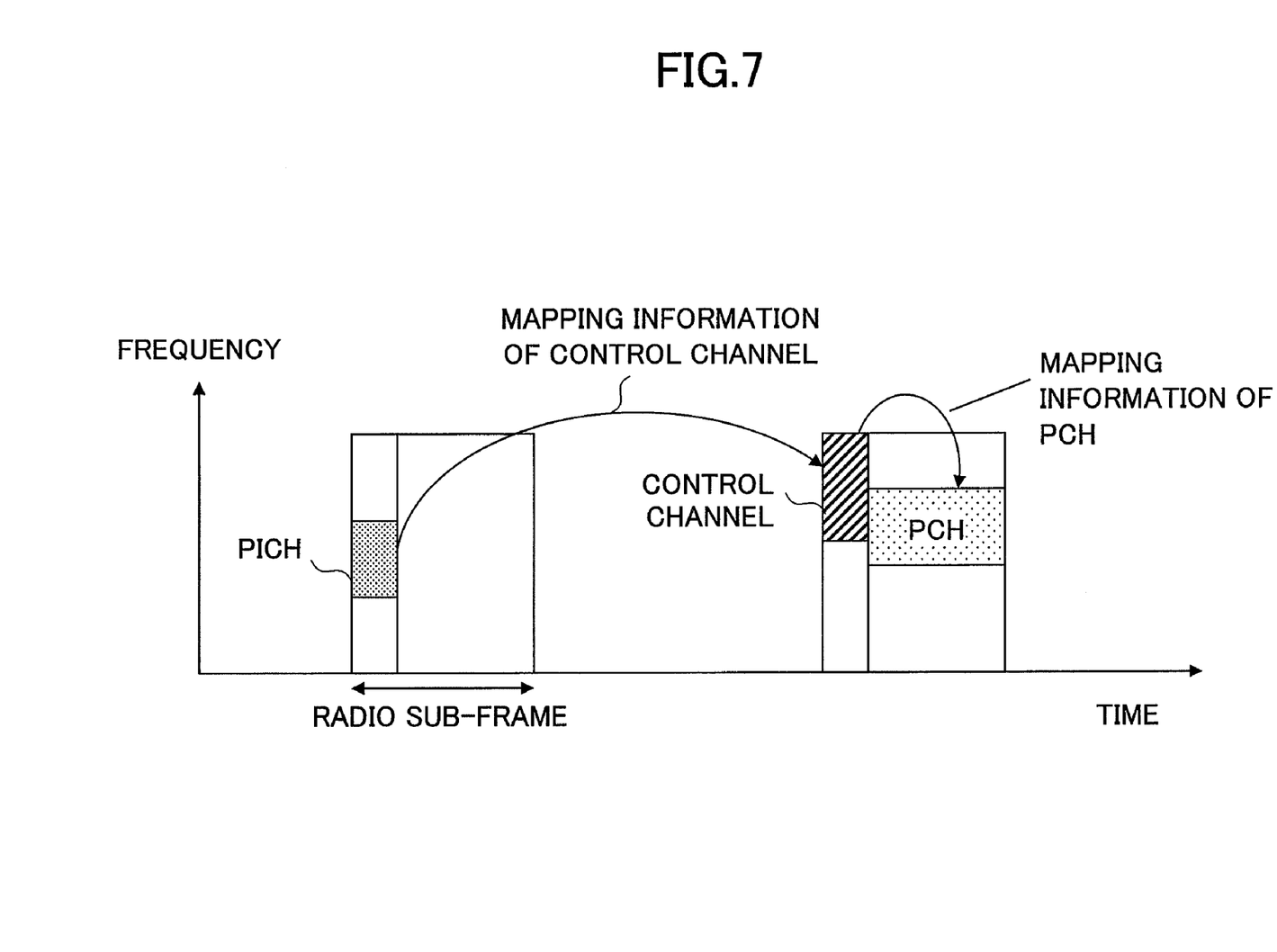
FIG. 7 is a drawing showing the information transmitted through a paging indicator channel (PICH)
Figure 8:
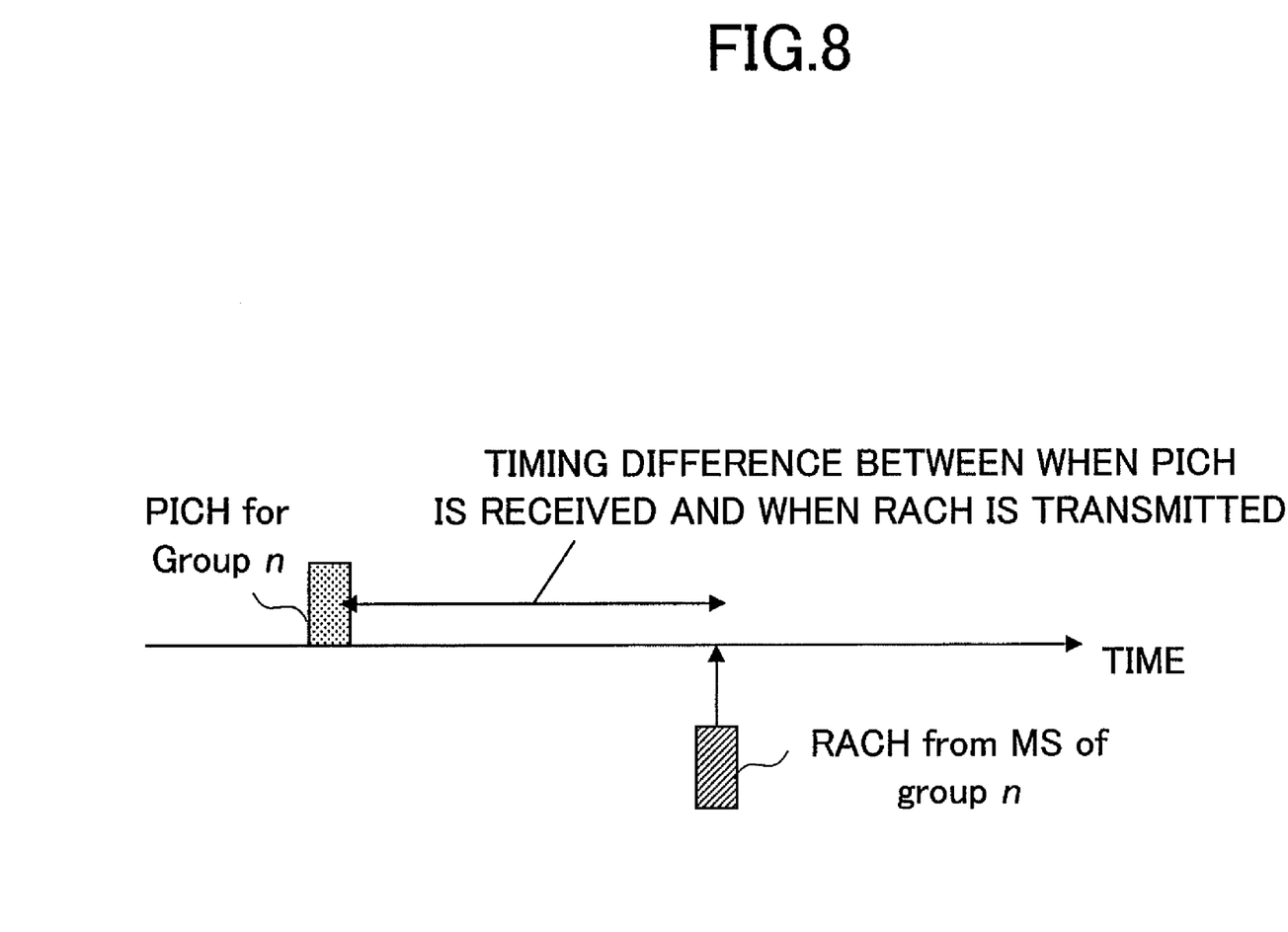
FIG. 8 is a drawing showing the transmission timing of a random access channel (RACH) as the response to the PICH.

The paging indicator generator 110 generates a paging indicator for informing whether the mobile station apparatus 200 is being paged. For example, the paging indicator generator 110 may generate information designating a paging group ID. Further, the paging indicator generator 110 may generate the information of the control channel designating the transmission bandwidth and the transmission timing of the PCH in addition to the information designating a paging group ID. The information of the control channel designating the transmission bandwidth and the transmission timing of the PCH is the mapping information of the control channel (CCH) transmitting the radio resource allocation information with respect to the PCH for the paging group, as shown in FIG. 7, the mapping information herein referring to the information about the transmission frequency bandwidth and the transmission timing of the CCH including, for example, the timing difference between the CCH and the PICH.

Further, the paging indicator generator 110 may generate the information of the transmission timing of the RACH as the response to the PICH in addition to the information designating a paging group ID. The information of the transmission timing of the RACH as the response to the PICH refers to the information indicating the timing difference between when the mobile station apparatus receives the PICH and when the mobile station apparatus transmits the RACH as the response to the PICH.

The generated paging indicator is encoded by the channel encoder 112, modulated by the modulating section 114, and transmitted to the transmission signal generator 104. The transmission signal generator 104 multiplexes the modulated paging indicator information into the paging indicator channel (PICH) to generate the transmission signal. The generated transmission signal is transmitted through the transmitting/receiving section 108.

The RACH transmitted from the mobile station apparatus 200 as the response to the PICH is received by the transmitting/receiving section 108 and transmitted to the RACH detecting section 106.

The RACH detecting section 106 detects whether the received RACH includes the information indicating the response to the PICH. Further, the RACH detecting section 106 detects the information indicating the reception timing of the RACH as the response to the PICH.

The information indicating the response to the PICH and the information indicating the reception timing of the RACH are transmitted to the paging information generation controlling section 122.

Based on the received information indicating the response to the PICH and information indicating the reception timing of the RACH, the paging information generation controlling section 122 determines whether the paging information is to be generated. Based on the information indicating the reception timing of the RACH, the paging information generation controlling section 122 specifies the group including the mobile station apparatus having transmitted the RACH, and transmits an instruction of generating the paging information with respect to the specified group to the paging information generating section 116.

The paging information generating section 116 generates the paging information indicating the ID of the paging mobile station apparatus. For example, the paging information generating section 116 generates a cell-specific ID as the ID of the paging mobile station apparatus. The cell-specific ID refers to a user equipment identity (UE-ID) effective in a cell (or plural cells) for informing the allocating information of the radio resource used in a link setting procedure and after communication is started with respect to the paging mobile station.

Figure 9:
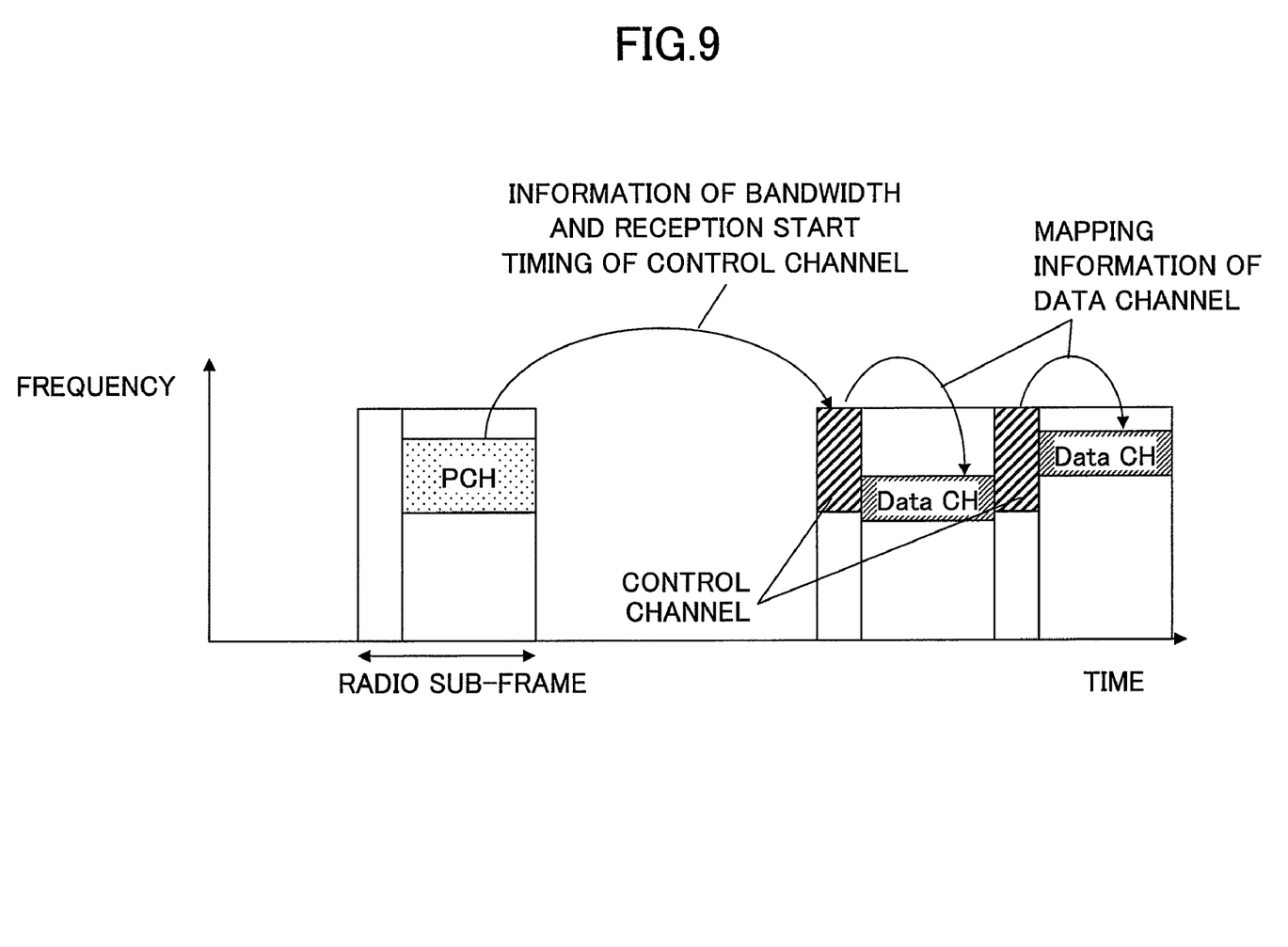
FIG. 9 is a drawing showing the information transmitted through a paging channel (PCH)

Further, the paging information generating section 116 may generate the information indicating the reception bandwidth and the reception start timing of an L1/L2 control channel in addition to the ID of the paging mobile station apparatus. Based on the information indicating the reception bandwidth and the reception start timing of an L1/L2 control channel, the reception bandwidth and the reception start timing of the L1/L2 control channel may be specified to receive the information of the transmission bandwidth and the transmission timing of the control information necessary for shifting from a waiting state to a communicating state. Through the L1/L2 control channel, the mapping information of a data channel is transmitted. As the information of the transmission timing, as shown in FIG. 9, the information designating uplink transmission timing such as the information indicating the timing difference between when the PICH is received and when the RACH is transmitted as the response to the PICH may be transmitted. By doing this, the base station apparatus may adjust the timing of receiving signals transmitted from different mobile station apparatuses.

The paging information is encoded by the channel encoder 112, modulated by the modulating section 114, and transmitted to the transmission signal generator 104. The transmission signal generator 104 multiplexes the modulated paging information into the paging channel (PCH) to generate the transmission signal. The generated transmission signal is transmitted through the transmitting/receiving section 108.

Next, a mobile station apparatus 200 according to an embodiment of the present invention is described with reference to FIG. 10.

Figure 10:
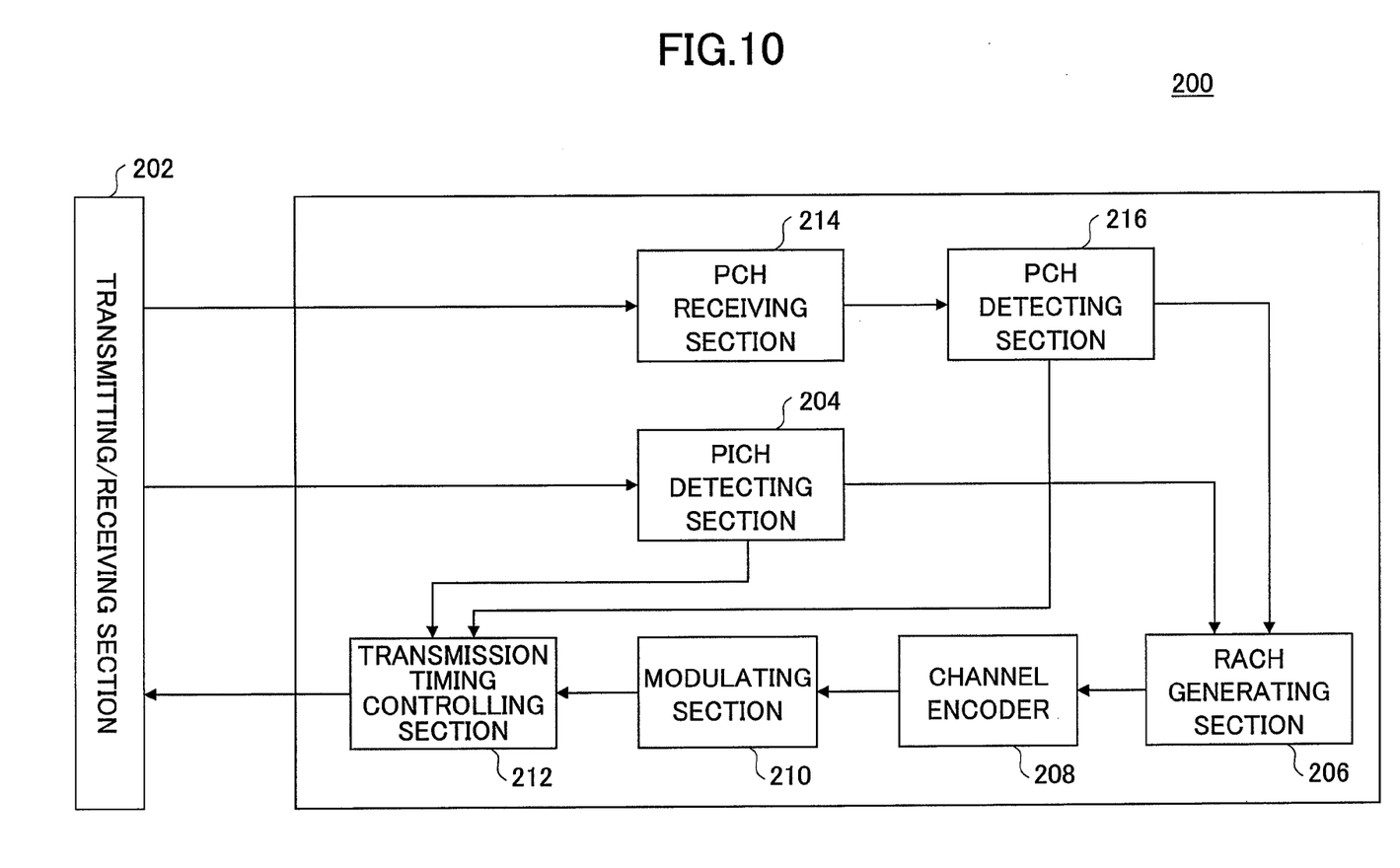
FIG. 10 is a partial block diagram showing a configuration of the mobile station apparatus according to an embodiment of the present invention.

As shown in FIG. 10, the mobile station apparatus 200 includes a transmitting/receiving section 202, a PICH detecting section 204, a RACH generating section 206, a channel encoder 208, a modulating section 210, a transmission timing controlling section 212, a PCH receiving section 214, and a PCH detecting section 216.

The PICH transmitted from the base station apparatus 100 is received by the transmitting/receiving section 202 and transmitted to the PICH detecting section 204.

The PICH detecting section 204 detects a paging group ID(s) from the transmitted PICH. Further, the PICH detecting section 204 detects whether the paging indicator with respect to a waiting group including the mobile station is included in the detected paging group ID(s). When the information indicating the group including the mobile station is detected, the PICH detecting section 204 transmits an instruction of generating the RACH as the response to the paging indicator to the RACH generating section 206. Further, the PICH detecting section 204 transmits the information indicating the transmission timing of the RACH as the response to the PICH to the transmission timing controlling section 212. Further, the PICH detecting section 204 detects the information of the control channel (CCH) designating the transmission bandwidth timing and the transmission timing of the PCH from the received PICH and transmits the detected information to the transmitting/receiving section 202.

Upon receiving the instruction of generating the RACH from the PICH detecting section 204, the RACH generating section 206 generates the random access channel (RACH) including the information indicating the response to the PICH and downlink reception quality (CQI) information. Herein, the term "downlink reception quality information" refers to coarse CQI information to be used for the link adaptation (adapted modulation channel encoding, transmission power control).

The random access channel (RACH) generated by the RACH generating section 206 is encoded by the channel encoder 208, modulated by the modulating section 210, and transmitted to the transmission timing controlling section 212. In the transmission timing controlling section 212, the transmission timing of the modulated random access channel (RACH) is controlled based on the information indicating the transmission timing of the RACH as the response to the PICH transmitted from the PICH detecting section 204. Then, the controlled RACH is transmitted through the transmitting/receiving section 202.

The transmitting/receiving section 202 receives the control channel (CCH) transmitted from the base station apparatus 100 based on the information of the control channel (CCH) designating the transmission bandwidth timing and the transmission timing of the PCH from the received PICH. Then, the transmitting/receiving section 202 transmits the received control channel (CCH) to the PCH receiving section 214. The PCH receiving section 214 designates the transmission bandwidth and the transmission timing of the PCH based on the control channel (CCH).

Further, the transmitting/receiving section 202 transmits the PCH to the PCH receiving section 214, the PCH transmitted from the base station apparatus 100. The PCH receiving section 214 receives the PCH based on the designated transmission bandwidth and the transmission timing of the PCH. The received PCH by the PCH receiving section 214 is transmitted to the PCH detecting section 216.

The PCH detecting section 216 detects the ID of paging mobile station apparatus and the reception bandwidth and the reception start timing of an L1/L2 control channel from the PCH. When the paging information with respect to the mobile station is detected, the PCH detecting section 216 transmits an instruction of generating the RACH as the response to the paging information to the RACH generating section 206. Further, the PCH detecting section 216 transmits the information indicating the transmission timing of the RACH as the response to the PCH to the transmission timing controlling section 212.

Upon receiving the instruction of generating the RACH from the PCH detecting section 216, the RACH generating section 206 generates the information indicating the response to the PCH and downlink reception quality (CQI) information. Herein, the term "downlink reception quality information" refers to the CQI information which is more detailed than the CQI information transmitted through the RACH as the response to the PICH.

The random access channel (RACH) generated by the RACH generating section 206 is encoded by the channel encoder 208, modulated by the modulating section 210, and transmitted to the transmission timing controlling section 212. In the transmission timing controlling section 212, the transmission timing of the modulated random access channel (RACH) is controlled based on the information indicating the transmission timing of the RACH as the response to the PCH transmitted from the PCH detecting section 216. Then, the controlled RACH is transmitted through the transmitting/receiving section 202.

Next, the operations of a mobile communication system according to an embodiment of the present invention are described with reference to FIG. 11.

Figure 11:
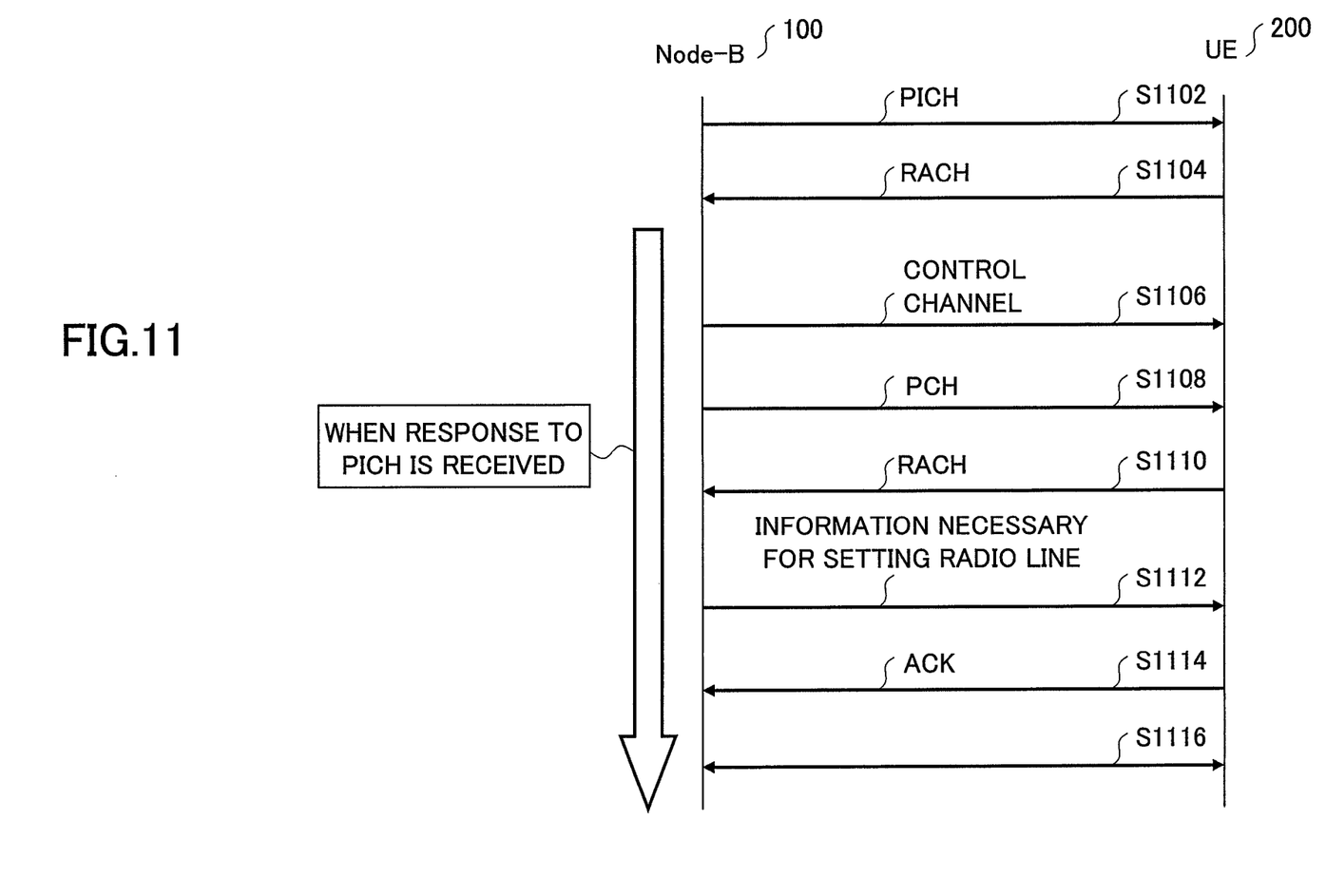
FIG. 11 is a sequential diagram showing the operation of a mobile communication system according to an embodiment of the present invention.

As shown in FIG. 11, the base station apparatus (Node-B) transmits the paging indicator channel (PICH) (step S1102).

In this case, all the base stations apparatuses in the paging area simultaneously transmit the PICH.

The mobile station apparatus 200 detects the paging group ID(s) from the PICH transmitted from the base station apparatus 100. Further, the mobile station apparatus 200 detects whether the paging indicator with respect to the waiting group including the mobile station is included in the paging group ID(s). When the information indicating the group including the own station is detected, the RACH as the response to the PICH is transmitted (step S1104).

Next, the base station apparatus 100 transmits the control channel (CCH) designating the radio resource allocation information with respect to the PCH (step S1106).

The mobile station apparatus 200 receives the control channel (CCH) transmitted from the base station apparatus 100 based on the information of the control channel (CCH) designating the transmission bandwidth timing and the transmission timing of the PCH from the received PICH. The mobile station apparatus 200 specifies the transmission bandwidth and the transmission timing of the PCH based on the control channel (CCH).

Next, the base station apparatus 100 transmits the PCH (step S1108). The mobile station apparatus 200 receives the transmitted PCH based on the designated transmission bandwidth and the transmission timing of the PCH.

From the received PCH, the mobile station apparatus 200 detects the ID of the paging mobile station apparatus and the reception bandwidth and the reception start timing of the L1/L2 control channel. When the mobile station is being paged, namely when the paging information of the mobile station is detected, the RACH as the response to the paging information is transmitted (step S1110).

Upon receiving the response to the PICH from the mobile station apparatus, the base station apparatus 100 transmits the information necessary for setting up a radio line to the paging mobile station apparatus (step S1112).

Based on the received information necessary for setting up the radio line, the paging mobile station apparatus 200 starts the procedure of setting up the radio line, and transmits an "ACK" signal to the base station (step S1114). Then the communications are started (step S1116).

In the above embodiment, when the paging group is designated, namely, when the mobile station apparatus 200 is turned ON or crosses a border of coverage areas, the base station apparatus 100 designates the transmission timing of the RACH. However, when designating the transmission timing of the RACH, the same paging group may be further divided into plural sub-groups so that each transmission timing of the sub-groups is different from each other.

As an example, a case is described where the paging mobile station apparatus is included in the sub-group "1" of the group "n".

Figure 12:
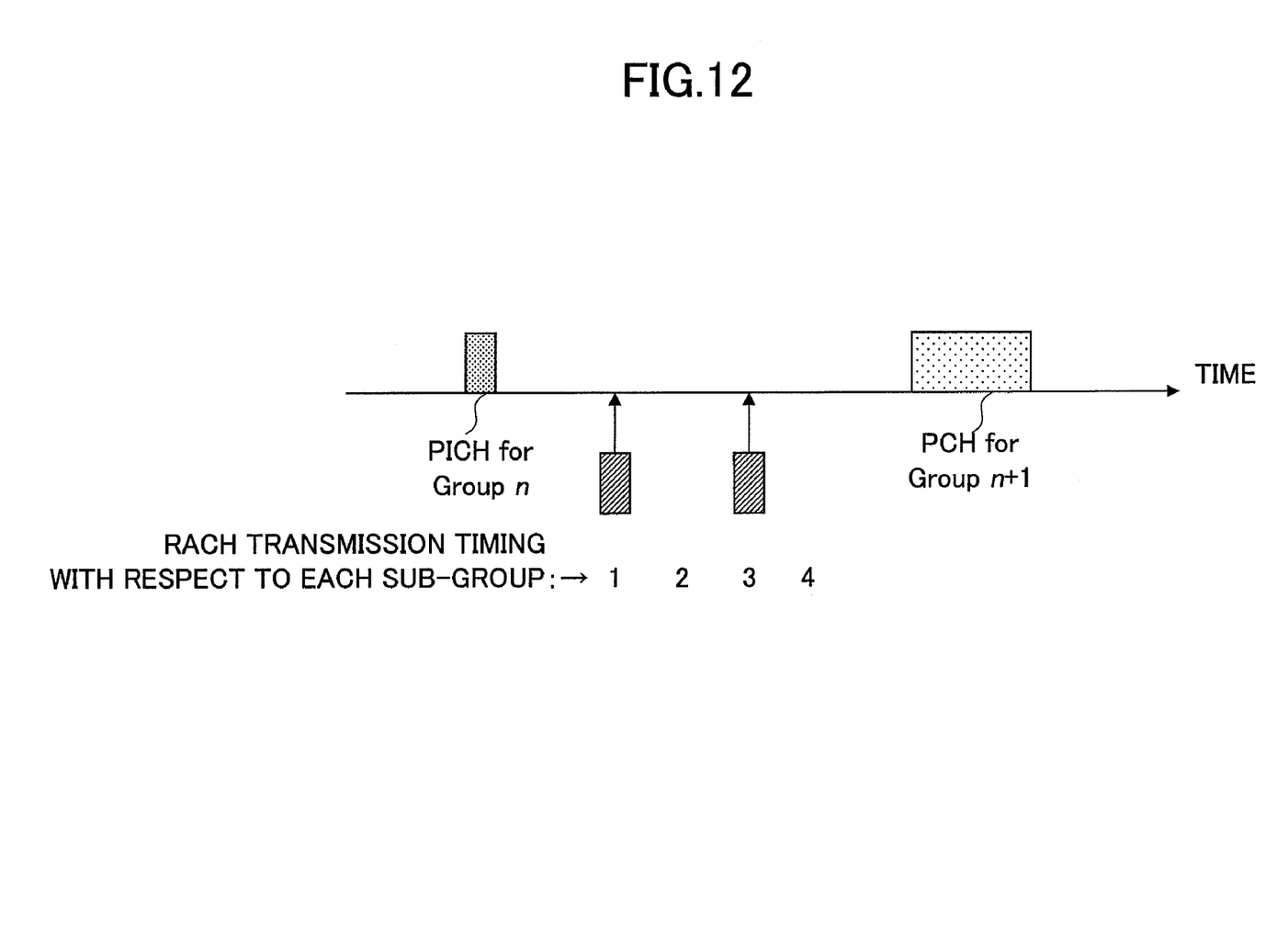
FIG. 12 is a drawing showing a method of designating the transmission timing of the RACH as the response to the PICH.
Figure 13:
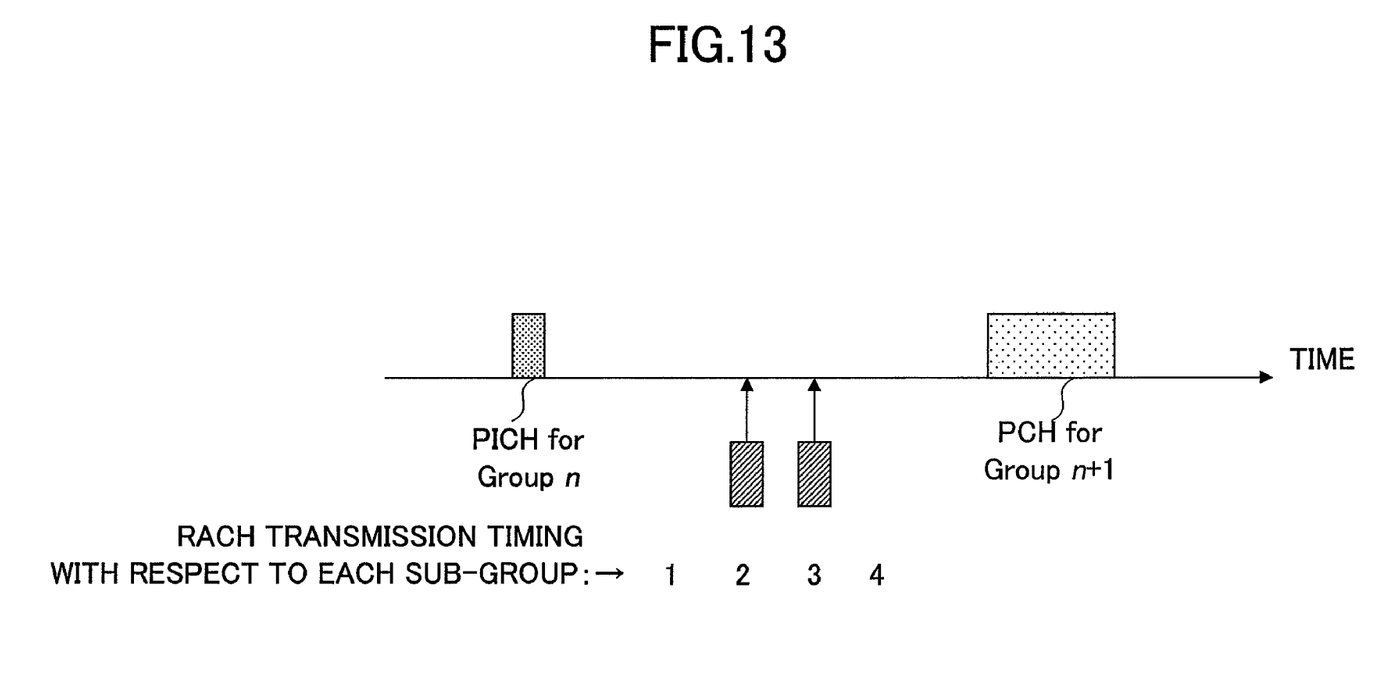
FIG. 13 is another drawing showing a method of designating the transmission timing of the RACH as the response to the PICH.

In this case, as shown in FIG. 12, when the RACH is received at the timing designated for the sub-group "1", namely, at the timing corresponding to the sub-group "1", the base station apparatus 100 transmits the PCH. On the other hand, when the RACH is received at the timing other than the timing designated for the sub-group "1", namely, at the timing other than the timing corresponding to the sub-group "1", the base station apparatus 100 does not transmit the PCH.

By doing this, when plural mobile stations in the same group are located in the same cell, the probability of the collision of the plural RACH transmission as the response to the PICH may be reduced. Further, the base station apparatus 100 may detect which sub-group of the mobile station apparatus is responding based on the reception timing of the RACH.

The present invention is described above by referring to a specific embodiment. However, a person skilled in the art may understand that the above embodiment is described for illustrative purpose only and examples of various modifications, transformations alternations, alternations, changes, and the like. To promote an understanding of the present invention, the specific values are used as the examples through the descriptions. However, it should be noted that such specific values are just sample values unless otherwise described, and any other values may be used. For illustrative purpose, the apparatus according to an embodiment of the present invention is described with reference to the functional block diagram. However, such an apparatus may be provided by hardware, software, or combination thereof. The present invention is not limited to the embodiment described above, and various modifications, transformations, alternation, exchanges, and the like may be made without departing from the scope and spirit from the present invention.

The present international application claims priority from Japanese Patent Application No. 2006-169440 filed on Jun. 19, 2006, the entire contents of which are hereby incorporated herein by reference.

Industrial Applicability

A mobile station apparatus, a base station apparatus, and a paging method according to an embodiment of the present invention may be applied to a radio communication system.

The invention claimed is:

1. A base station apparatus comprising:
a random access channel detecting unit, when a paging indicator channel (PICH) is transmitted and information indicating a response to the paging indicator channel (PICH) is transmitted through a random access channel (RACH) from a mobile station apparatus included in a group which is being paged, detecting the random access channel (RACH) as the response to the paging indicator channel (PICH);
a paging information generation determining unit determining whether paging information is to be generated based on the detection result of the random access channel (RACH); and
a paging information generating unit generating paging information based on the determination result.

2. The base station apparatus of claim 1, further comprising:
a paging indicator generating unit generating a paging indicator including information indicating the transmission frequency bandwidth and the transmission timing of a control channel (CCH) designating the transmission frequency bandwidth and the transmission timing of a paging channel (PCH); and
a transmitting unit multiplexing the paging indicator into a paging indicator channel (PICH) and transmitting the paging indicator.

3. The base station apparatus according to claim 2, wherein the paging indicator generating unit generates information indicating timing difference between when the control channel (CCH) is transmitted and when the paging indicator channel (PICH) is transmitted.

4. The base station apparatus according to claim 2, wherein the paging indicator generating unit generates information indicating the transmission timing of a random access channel (RACH) as a response to the paging indicator channel (PICH).

5. The base station apparatus according to claim 4, wherein a paging group transmitted through the paging indicator channel (PICH) is divided into plural sub-groups, and the paging indicator generating unit designates the transmission timing of the random access channel (RACH) as a response to the paging indicator channel (PICH) in a manner so that each transmission timing of the random access channel (RACH) with respect to the corresponding sub-group is different from each other.

6. The base station apparatus according to claim 1, wherein the paging information generating unit generates information indicating the reception bandwidth and the reception start timing of an L1/L2 control channel for receiving information of the reception bandwidth and the reception start timing of control information necessary for shifting from a waiting state to a communicating state.

7. A paging method comprising:
a random access channel generating step of, when a group including a mobile station is being paged based on a paging indicator channel (PICH) transmitted from a base station apparatus, generating a random access channel (RACH) including information indicating a response to the paging indicator channel (PICH) by a mobile station apparatus;
a transmitting step of transmitting the random access channel (RACH) by the mobile station apparatus;
a random access channel detecting step of detecting the random access channel (RACH) as the response to the paging indicator channel (PICH) by the base station apparatus;
a paging information generation determining step of determining whether paging information is to be generated based on a detection result of the random access channel (RACH); and
a paging information generating step of generating paging information based on the determination result.

* * * * *